(12) United States Patent
Nakabayashi et al.

(10) Patent No.: US 11,598,902 B2
(45) Date of Patent: Mar. 7, 2023

(54) OPTICAL MEMBER, OPTICAL APPARATUS, IMAGING APPARATUS, AND MANUFACTURING METHOD OF OPTICAL MEMBER

(71) Applicant: CANON KABUSHIKI KAISHA, Tokyo (JP)

(72) Inventors: Masaaki Nakabayashi, Yokohama (JP); Hiroyuki Tanaka, Kawasaki (JP); Masaya Hisamatsu, Yokohama (JP); Manami Tomizuka, Hirosaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 17/033,328

(22) Filed: Sep. 25, 2020

(65) Prior Publication Data

US 2021/0096284 A1    Apr. 1, 2021

(30) Foreign Application Priority Data

Sep. 30, 2019 (JP) .............................. JP2019-180957
Jul. 31, 2020 (JP) .............................. JP2020-129816

(51) Int. Cl.
*G02B 1/11* (2015.01)
*G02B 5/00* (2006.01)

(52) U.S. Cl.
CPC ................ *G02B 1/11* (2013.01); *G02B 5/003* (2013.01)

(58) Field of Classification Search
CPC . G02B 1/10; G02B 1/11; G02B 5/003; G02B 1/118
See application file for complete search history.

(56) References Cited

U.S. PATENT DOCUMENTS

| 2008/0305254 | A1* | 12/2008 | Tanaka | C08J 7/043 428/432 |
| 2010/0247758 | A1* | 9/2010 | Nakayama | B05D 5/02 106/287.17 |
| 2011/0315557 | A1* | 12/2011 | Hayashi | B29C 33/424 204/290.01 |
| 2014/0044919 | A1* | 2/2014 | Makino | G02B 1/118 428/141 |
| 2017/0176644 | A1* | 6/2017 | Nakayama | B32B 27/20 |

FOREIGN PATENT DOCUMENTS

JP    2002-45781 A    2/2002
JP    2007-119851 A   5/2007

* cited by examiner

*Primary Examiner* — Jia X Pan
(74) *Attorney, Agent, or Firm* — Canon U.S.A., Inc., IP Division

(57) ABSTRACT

An optical member includes a base material containing aluminum or aluminum alloy, a first layer including black porous aluminum oxide provided on the base material, and a second layer including aluminum oxide having a plurality of projection portions provided on the first layer.

12 Claims, 6 Drawing Sheets

OPTICAL MEMBER, OPTICAL APPARATUS, IMAGING APPARATUS, AND MANUFACTURING METHOD OF OPTICAL MEMBER

BACKGROUND OF THE INVENTION

Field of the Invention

The present disclosure relates to an optical member having a low reflectance used for an inner wall of an interchangeable lens and others and a manufacturing method of the optical member. The present disclosure further relates to an optical apparatus and an imaging apparatus using the optical member.

Description of the Related Art

An optical apparatus such as an interchangeable lens is provided with an optical system including a housing and a plurality of lenses provided in the housing. A light beam incident on the optical apparatus mainly enters the lens and forms an image, so that an object image is formed. On the other hand, there is a light beam that does not either form an image or contribute to formation of the object image. The light beam that does not contribute to formation of the object image enters from a random direction and thus enters a part other than the lens, so that the light beam can be a factor causing unnecessary reflection and scattering in the housing. Such light is referred to as stray light. The stray light reaching an image pickup element can be a factor that causes flare and ghost.

As a measure for suppressing stray light, Japanese Patent Application Laid-Open No. 2007-119851 discusses an article having an electroless nickel black plating film usable for a camera and the like and having excellent abrasion resistance. Japanese Patent Application Laid-Open No. 2002-45781 discusses an article in which polyimide is implanted in a metal plate by an electrostatic flocking method.

However, the article discussed in Japanese Patent Application Laid-Open No. 2007-119851 has small unevenness on a surface and thus has an issue that a reflectance increases if an incident angle of a light beam becomes larger. The article discussed in Japanese Patent Application Laid-Open No. 2002-45781 has a possibility that polyimide may peel off by aging and vibration, and an optical characteristic may change.

SUMMARY OF THE INVENTION

According to an aspect of the present disclosure, an optical member includes a base material containing aluminum or aluminum alloy, a first layer including black porous aluminum oxide provided on the base material, and a second layer including aluminum oxide having a plurality of projection portions provided on the first layer.

According to another aspect of the present disclosure, a method for manufacturing an optical member including performing alumite treatment on a base material containing aluminum or aluminum alloy to form porous aluminum oxide on a surface of the base material, etching the porous aluminum oxide to form a projection portion containing aluminum oxide, and dyeing the base material on which the projection portion is formed black and forming a first layer including black porous aluminum oxide on the base material and a second layer including aluminum oxide having a plurality of projection portions on the first layer.

Further features of the present disclosure will become apparent from the following description of exemplary embodiments with reference to the attached drawings.

DESCRIPTION OF THE EMBODIMENTS

<Optical Member>

Figure 1:
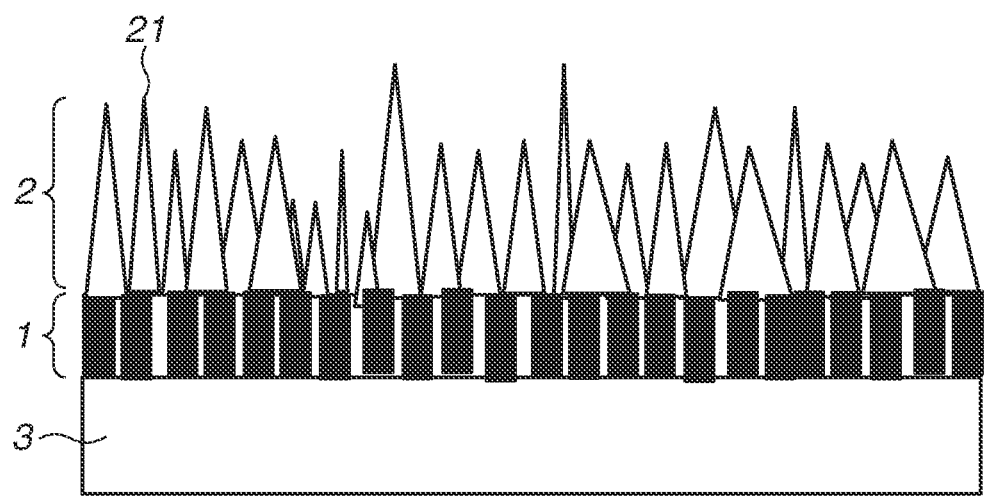
FIG. 1 is a schematic diagram of an optical member according to a first exemplary embodiment.

FIG. 1 is a schematic diagram of an optical member according to a first exemplary embodiment. The optical member 10 according to the first exemplary embodiment includes a base material 3, a first layer 1, and a second layer 2.

The base material 3 is made of aluminum or aluminum alloy. In the present disclosure, aluminum alloy is an alloy containing aluminum as a principal component and alloy containing 90 parts by mass or more of aluminum based on 100 parts by mass of alloy. A material of the base material 3 is not particularly limited as long as the material is made of aluminum or aluminum alloy, and can be appropriately selected from high purity aluminum, 1000, 3000, and 5000 series, and the like. A thickness of the base material 3 is not particularly limited, but is desirable to be 500 µm or more to maintain a mechanical strength of the optical member 10.

Figure 2:
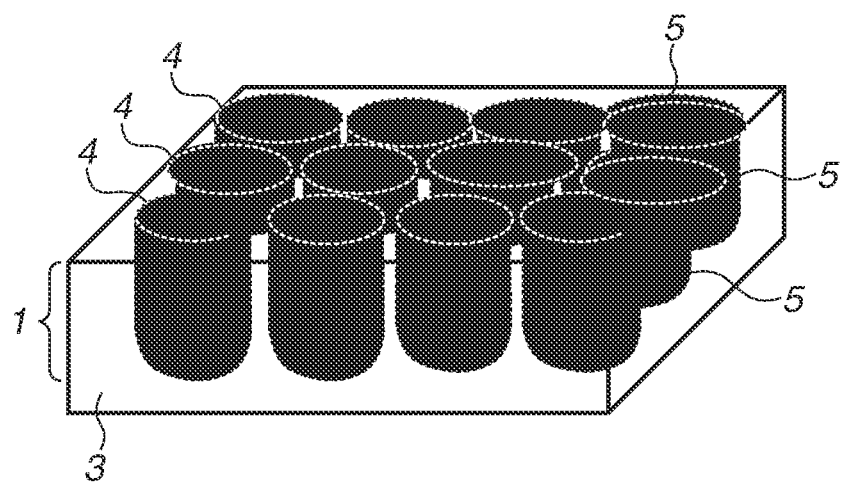
FIG. 2 is a schematic diagram of a first layer of the optical member according to the first exemplary embodiment.

FIG. 2 is a schematic diagram illustrating the first layer 1 with the second layer 2 omitted, and the thickness of the base material 3 is reduced for convenience of description. The first layer 1 is a member that absorbs a light beam entering from the second layer 2 to the first layer 1. The first layer 1 is porous aluminum oxide disposed on the base material 3 and has a plurality of pores 4. The plurality of pores 4 is filled with a black dyeing material 5, and thus the first layer 1 is dyed black. "Black" described here means a color having adsorption in an entire range of light wavelengths of 380 nm or more and 780 nm or less. In addition, it is desirable that the first layer 1 has blackness of 0.7 or more indicated by a ratio of a maximum absorption rate to a minimum absorption rate in the range of light wavelengths of 380 nm or more and 780 nm or less.

The pore 4 has a circular shape or an elliptical shape when the optical member 10 in FIG. 2 is viewed in a plan view from above, and has a diameter or a major axis in a range of 10 nm or more and 60 nm or less. A depth of the pore 4 is in a range of 7 µm or more and 100 µm or less. In other words, a thickness of the first layer 1 is in the range of 7 µm or more and 100 µm or less. If the thickness of the first layer 1 is less than 7 µm, the first layer 1 cannot sufficiently adsorb a light beam reflected, diffused, scattered by the second layer 2, and may not sufficiently reduce the reflectance. On the other hand, to make the thickness of the first layer 1 more than 100 μm is difficult for a manufacturing method described below, and a sufficient yield may not be obtained. A shape of the pore 4 in a depth direction is not particularly limited as long as it can be filled with the black dyeing material 5, and the shape may be larger or smaller than the above-described diameter or major axis.

The black dyeing material 5 is used to enhance an adsorption efficiency of the light beam entering the first layer 1. A type of the black dyeing material is not particularly limited and may be an organic material such as dyeing ink and an inorganic material including metal such as nickel, cobalt, and copper.

Referring back to FIG. 1, the second layer 2 is described. The second layer 2 is a member including aluminum oxide having a plurality of projection portions 21 and reflects, diffuses, and scatters a light beam incident among the projection portions. The light beam reflected, diffused, and scattered among the projection portions is adsorbed by the first layer 1, and thus an amount of the light beam returning to an optical path can be reduced. As a result, the optical member according to the first exemplary embodiment can reduce the reflectance with respect to the light beam in a wavelength range of 550 nm or more and 650 nm or less caused by occurrence of flare and ghost. It is desirable that the plurality of projection portions 21 is tapered from a surface in contact with the first layer 1 in a direction in which the projection portions extend. The plurality of projection portions 21 have a tapered shape toward a tip, and thus, a phenomenon such as reflection, diffusion, and scattering efficiently occurs among the projection portions. As a result, the amount of the light beam returning to the optical path can be further reduced.

It is desirable that a thickness of the second layer 2 is in a range of 2 μm or more and 15 μm or less. In other words, it is desirable that a height of the projection portion 21 is in the range of 2 μm or more and 15 μm or less. If the height of the projection portion 21 is in this range, the reflectance can be lowered even if an incident angle is large, and there is less possibility of a characteristic change due to aging and vibration. If the height of the projection portion 21 is less than 2 μm, there is a possibility that the light beam entering among the projection portions is not sufficiently reflected, diffused, and scattered. Further, if the height of the projection portion 21 is more than 15 μm, there is a possibility that the projection portion is damaged due to aging and vibration.

A ratio of the number of the projection portions 21 to an area of the first layer 1 is desirable to be in a range of 50 pieces/100 μm$^2$ or more and 150 pieces/100 μm$^2$ or less when the optical member 10 is viewed in a plan view from an extending direction of the projection portion 21. If the above-described ratio is less than 50 pieces/100 μm$^2$, there is a possibility that the light beam entering among the projection portions is not sufficiently reflected, diffused, and scattered. If the above-described ratio is more than 150 pieces/100 μm$^2$, the light beam is totally reflected and returns to the optical path, and there is a possibility that the reflectance cannot be sufficiently reduced.

It is desirable that the projection portion 21 includes a first shape having a thickness in a range of 0.1 μm or more and 1.1 μm or less and a second shape having a thickness in a range of 10 μm or more and 50 μm or less. If the projection portion 21 includes only the first shape, it may be difficult to keep the thickness of the second layer at 2 μm or more. On the other hand, if the projection portion 21 includes only the second shape, there is a possibility that the reflectance cannot be sufficiently reduced in a case where the incident angle of the light beam is 80 degrees or more. The thickness of the projection portion 21 means a thickness at a position 2 μm from the tip.

The second layer 2 may or may not be dyed black.

It is desirable that an average reflectance of the optical member 10 is 2.0% or less at the incident angle of 85 degrees in the wavelength range of 550 nm or more and 650 nm or less. If the average reflectance in the above-described range is 2.0% or less, the optical member 10 can be applied to an optical apparatus requiring a high optical performance More desirable average reflectance in the above-described range is 1.0% or less, and further more desirable average reflectance in the above-described range is 0.8% or less.

<Manufacturing Method of Optical Member>

A manufacturing method of the optical member according to the first exemplary embodiment is described.

First, a plate material of aluminum or aluminum alloy as the base material 3 is prepared. The plate material is generally processed by cutting, and thus dirt and oil adhering to the plate material at the time of cutting process is removed. The plate material is immersed in an organic solvent such as acetone and degreased by being ultrasonically cleaned. In a case of dirt and a scratch that cannot be removed by ultrasonic cleaning, the plate material is immersed in strong alkaline solution such as sodium hydroxide and is subjected to chemical polishing. Further, a smut generated on a surface of the plate material by the chemical polishing is removed by being immersed in sulfuric acid or nitric acid.

Figure 3A:
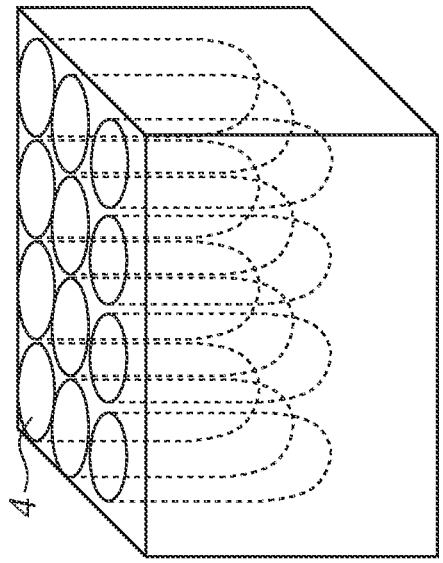
FIGS. 3A to 3D are schematic diagrams illustrating a manufacturing method of the optical member according to the first exemplary embodiment.

Next, anodizing processing is performed on the plate material of aluminum or aluminum alloy. If anodizing processing is performed, a porous (also referred to as a porous structure) aluminum oxide coat including a plurality of pores is generated on a surface of the plate material as illustrated in FIG. 3B from a state in FIG. 3A.

Sulfuric acid added with aluminum sulfate as an electrolytic solution is stored in a treatment tank. The plate material of aluminum or aluminum alloy is set as an anode and is electrically connected to a power source together with a cathode. The cathode may be made of a material such as carbon, platinum, titanium, and stainless steel (SUS) as long as it has low reactivity with the electrolytic solution. It is desirable that temperature of the electrolytic solution is controlled by a chiller. Anodizing processing is performed by applying a voltage from the power source to the anode and the cathode during the time period of 10 to 120 minutes, and the pores 4 are formed near the surface of aluminum metal or aluminum alloy as illustrated in FIG. 3B. The plate material is taken out of the treatment tank and is rinsed with water to remove the electrolytic solution.

Figure 3B:
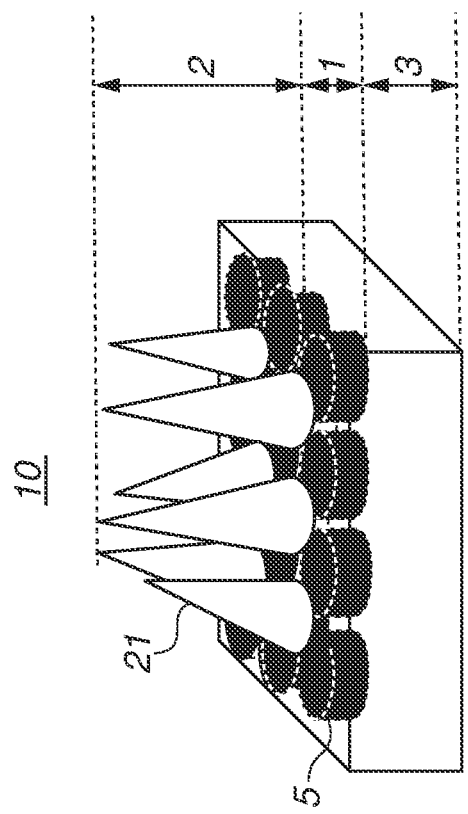

Next, the pores 4 on the plate material having a shape as illustrated in FIG. 3B made by anodizing processing are immersed in a solvent. It is desirable that the solvent has good wettability with aluminum oxide. As the solvent, acetone, isopropyl alcohol, and the like can be used. If a large amount of water remains in the pores 4, it takes time to replace water with the solvent. Therefore, it is desirable to heat and dry the anodized plate material. An immersion time is, for example, one to ten hours. The above-described immersion process may be omitted.

Next, etching is performed on a surface of the plate material in which the pores 4 are formed. An etching solution is prepared in a treatment tank, and the plate material in which the pores 4 are formed is immersed therein. It is desirable that temperature of the etching solution is 40 to 60° C., and an etching time is 5 to 30 minutes. It is desirable to generate a liquid flow in the etching solution by a pump, and an etching rate can be controlled by setting the liquid flow at a constant speed. The solvent filling the pores 4 is compatibly mixed and replaced with the etching solution, and the etching solution deeply permeates the pores 4. The surface of the plate material and inner walls of the pores 4 are etched at the same time, and thus the projection portions of aluminum oxide are formed as illustrated in FIG. 3C.

The thickness of the second layer and a shape of the projection portion can be controlled by the etching rate. The etching rate can be controlled by a type of the solvent, the immersion time in the solvent, and a type of the etching solution. Specifically, the thickness of the second layer can be reduced by further advancing the etching, and the tip of the projection portion can be thin and short by further advancing the etching. If the projection portion is made thinner to about 1 μm, a part of the projection portion is aggregated with each other among adjacent projection portions, and the projection portion in the second shape having the thickness in the range of 10 μm or more and 50 μm or less is formed. Thus, the first shape having the thickness in the range of 0.1 μm or more and 1.1 μm or less and the second shape can exist together.

Figure 3C:
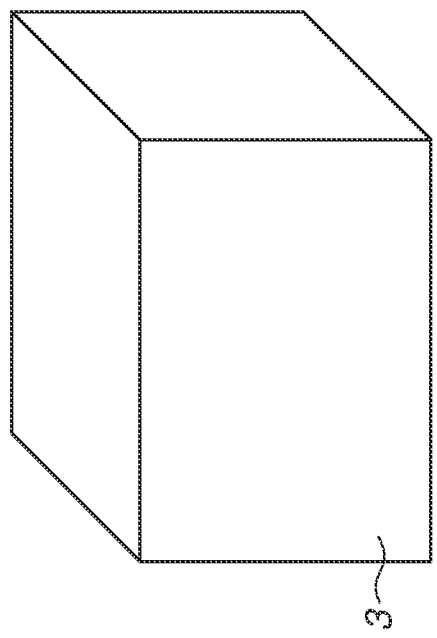
Figure 3D:
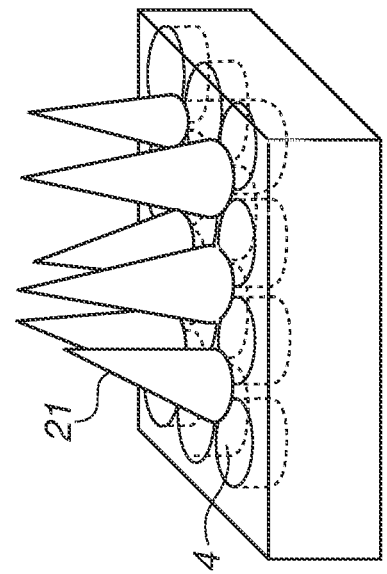

Finally, the aluminum oxide on which the projection portions as illustrated in FIG. 3C are formed is dyed black. The aluminum oxide having the projection portions is immersed in sulfuric acid to activate a surface of the aluminum oxide that is rinsed in water after etching. An immersion time is 30 seconds to 3 minutes. Further, the aluminum oxide is immersed in a pretreatment agent for 30 seconds to 3 minutes and heated in a water bath of pure water to be dyed. After heated in the water bath, the aluminum oxide is immersed in an aqueous solution in which dye is dissolved for 5 to 20 minutes. Finally, the aluminum oxide is rinsed again and then dried, and thus the optical member according to the first exemplary embodiment as illustrated in FIG. 3D can be obtained. In other words, the first layer 1, which includes black porous aluminum oxide disposed on the base material 3 made of aluminum or aluminum alloy and the pores 4 filled with the black dyeing material, is formed. At the same time, the second layer 2 including a plurality of aluminum oxide projection portions 21 is formed on the first layer 1.

Pore sealing treatment may be performed by coating the surface of the aluminum oxide with a small amount of aluminum sulfate after rinsing.

<Optical Apparatus and Imaging Apparatus>

Figure 4:
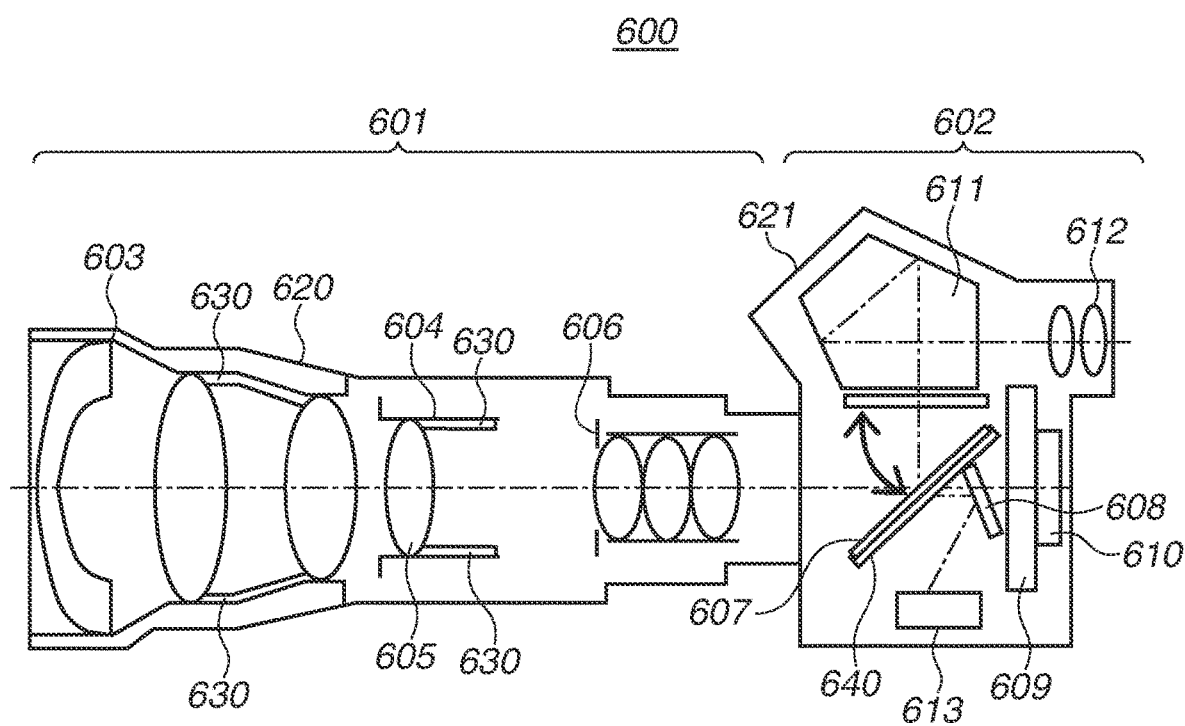
FIG. 4 is a schematic diagram of an imaging apparatus according to a second exemplary embodiment.

FIG. 4 illustrates a configuration of a single-lens reflex digital camera as an imaging apparatus according to a second exemplary embodiment of the present disclosure. In FIG. 4, a camera body 602 is connected to a lens barrel 601 serving as an optical apparatus, but the lens barrel 601 is an interchangeable lens, which is attachable to and detachable from the camera body 602.

Light from an object passes through an optical system including a plurality of lenses 603 and 605 arranged on an optical axis of an imaging optical system in a housing 620 of the lens barrel 601 and is received by an image pickup element 610. The lens 605 is supported by an inner barrel 604 so as to be movable with respect to an outer barrel of the lens barrel 601 for focusing and zooming. The inner barrel 604 is a supporting member for supporting the lens 605.

During an observation period before imaging, the light from the object is reflected by a main mirror 607 in a housing 621 of the camera body 602 and passes through a prism 611, and then, a captured image is displayed to a user through a finder lens 612. The main mirror 607 is, for example, a half mirror. The light passing through the main mirror 607 is reflected in a direction of an autofocus (AF) unit 613 by a sub mirror 608, and the reflected light is used, for example, for range-finding. The main mirror 607 is attached to a main mirror holder 640 by adhesion and the like and supported thereby. At the time of imaging, a driving mechanism (not illustrated) moves the main mirror 607 and the sub mirror 608 outside an optical path and opens a shutter 609, and a light image for image-capturing incident from the lens barrel 601 is formed on the image pickup element 610. An aperture stop 606 can change brightness and a depth of focus at the time of imaging by changing an aperture area.

The optical member according to the first exemplary embodiment can be used in an imaging apparatus and an optical apparatus by forming aluminum oxide 630 (an aluminum oxide lamination structure including black porous aluminum oxide and a plurality of projection portions) on an inner wall side of the housing 620 and of the inner barrel 604 as a base material. In a case where the projection portions are arranged on the inner wall side, the housing 620 and the inner barrel 604 may be formed of a metal such as magnesium, and the optical member may be provided as a member separate from the housing 620 and the inner barrel 604.

The optical apparatus according to the second exemplary embodiment includes a portion having a low reflectance with respect to a large incident angle in the housing. Therefore, a probability of occurrence of flare and ghost can be sufficiently reduced in an image captured by the imaging apparatus including the optical apparatus according to the second exemplary embodiment and the image pickup element.

EXAMPLES

Prior to a description of examples, a method for evaluating an optical member manufactured in the examples is described.

[Shape Evaluation]

A thickness of the first layer, a thickness of the second layer, thicknesses of the projection portions on the second layer, and a ratio of the number of the projection portions with respect to the first layer were calculated from an image at a magnification of 2000 by a scanning electron microscope. Specifically, images were respectively obtained for ten cross sections of the optical member cut in a laminated direction, each parameter was measured from the obtained images, and an average value of the ten cross sections ware adopted.

[Optical Property Evaluation]

A reflectance of the optical member in the wavelength range of 550 nm or more and 650 nm or less was measured for each 1 nm in a state of setting an incident angle of a light beam to a desired value using an ultraviolet-visible near infrared spectrophotometer (manufactured by JASCO Corporation, product name: V-770), and an average value of the measured values was regarded as the reflectance at the incident angle. The measurement was performed after correcting a background.

Example 1

An aluminum plate material having a thickness of 10 mm was used, and an aluminum piece having a size of 40 mm×40 mm×10 mm was cut off from the aluminum plate material. The cut aluminum piece was immersed in acetone and subjected to ultrasonic cleaning for three minutes. Subsequently, the aluminum piece was immersed in sodium hydroxide having a concentration of 1 N for four minutes to be subjected to chemical polishing and further immersed in nitric acid having a concentration of 1 N for one minute to remove smut.

Next, anodizing processing was performed in a state of setting the aluminum piece to an anode and carbon to the cathode. The electrolytic solution was adjusted so that a concentration of sulfuric acid was 180 g/L, and a concentration of aluminum ion in aluminum sulfate was 8 g/L. The temperature of the electrolytic solution in the treatment tank was maintained at 20° C. using a chiller, and a voltage was applied to the anode and the cathode by using the power source. The voltage was adjusted so that a current density was 1 A/dm$^2$ with respect to an area of a portion to be anodized. The voltage was applied for 40 minutes, and pores as illustrated in FIG. 3B were formed. The formed pores were circular with a diameter of 30 nm and a depth of 40 µm.

Subsequently, the aluminum piece in which the pores were formed was immersed in acetone as the solvent for five hours so that the solvent permeated the pores.

Subsequently, etching was performed on a surface of the aluminum piece in which the pores were formed. Phosphoric acid having a concentration of 1 mol/L was prepared as the etching solution in the treatment tank. The aluminum piece was immersed in the phosphoric acid maintained at a temperature of 55° C. for ten minutes, and thus aluminum oxide having a projection structure as illustrated in FIG. 3C was formed on the surface of the aluminum piece.

Then, the aluminum piece was immersed in sulfuric acid having a concentration of 100 ml/L for one minute to activate the surface of the aluminum oxide. Further, in order to adjust a surface condition, the aluminum piece was immersed in a solution of a dyeing pretreatment agent (manufactured by Okuno Chemical Industries Co., Ltd., product name: TAC SORMAL-120) having a concentration of 50 g/L maintained at a temperature of 45° C. for one minute and further heated in a water bath of pure water at 55° C. for ten minutes. Then, the aluminum piece was immersed in an aqueous solution of a black dye material (manufactured by Okuno Chemical Industries Co., Ltd., product name: TAC BLACK-SLH (Black 415)) dissolved at a concentration of 10.1 g/L maintained at a temperature of 55° C. for ten minutes. Lastly, the aluminum piece was rinsed in water and dried. In this way, the optical member of the example 1 was obtained.

The thickness of the first layer of the optical member of the example 1 was 10 µm. The thickness of the second layer was 12.7 µm. The projection portions included the first shape having a thickness in the range of 0.1 µm or more and 1.1 µm or less and the second shape having a thickness in the range of 10 µm or more and 50 µm or less. The ratio of the number of the projection portions to the area of the first layer was 128 pieces/100 µm$^2$.

Example 2

An optical member of an example 2 was obtained by a method similar to that of the example 1 except that the process for immersing in the solvent was not performed. The thickness of the first layer of the optical member of the example 2 was 9 µm. The thickness of the second layer was 10.5 µm. The thicknesses of the projection portions were all in the range of 10 µm or more and 50 µm or less. In other words, the projection portions included only the second shape. The ratio of the number of the projection portions to the area of the first layer was 62 pieces/100 µm$^2$.

Figure 5:
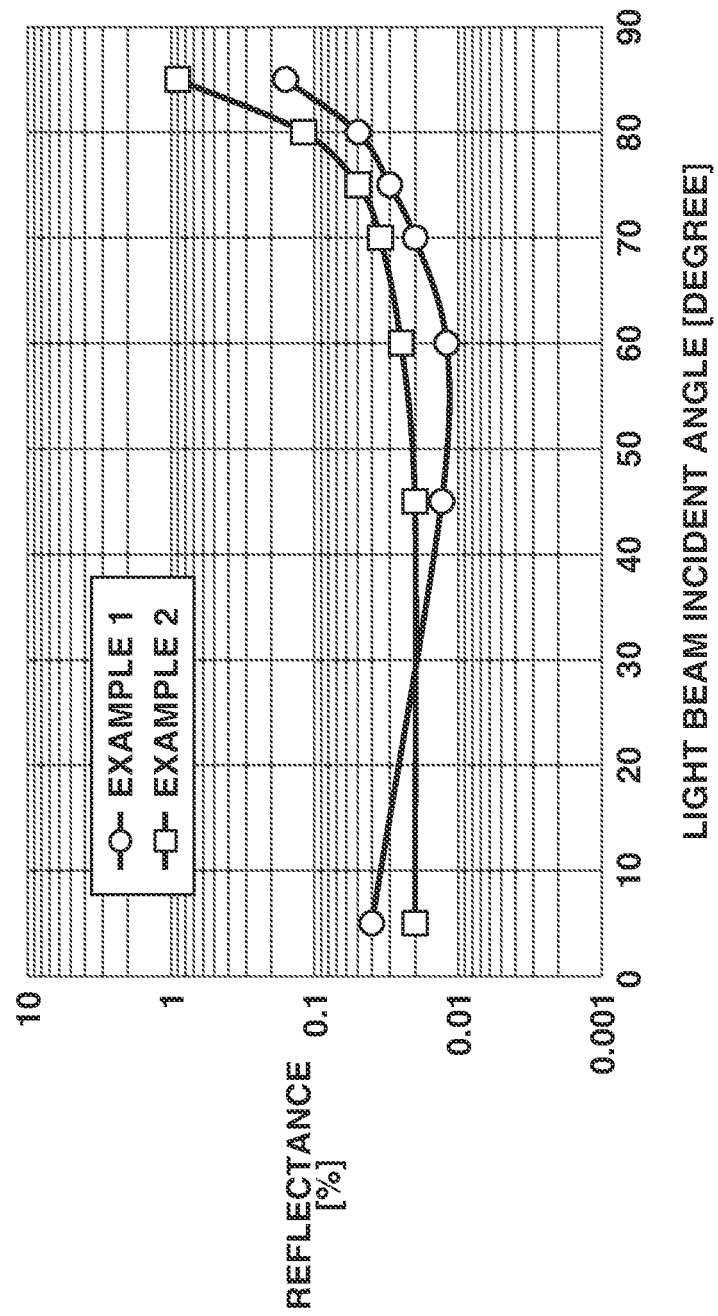
FIG. 5 is a graph illustrating reflectances of an example 1 and an example 2.

FIG. 5 illustrates results indicating dependency on light beam incident angle of the reflectances of the optical members of the example 1 and the example 2. As the incident angle of the light beam increases, a difference in the reflectances between the example 2 and the example 1 increases. It is considered that the optical member of the example 1 includes the projection portions having not only the second shape but also the first shape, and thus the reflectance can be lower than that of the optical member of the example 2.

Example 3

Figure 6:
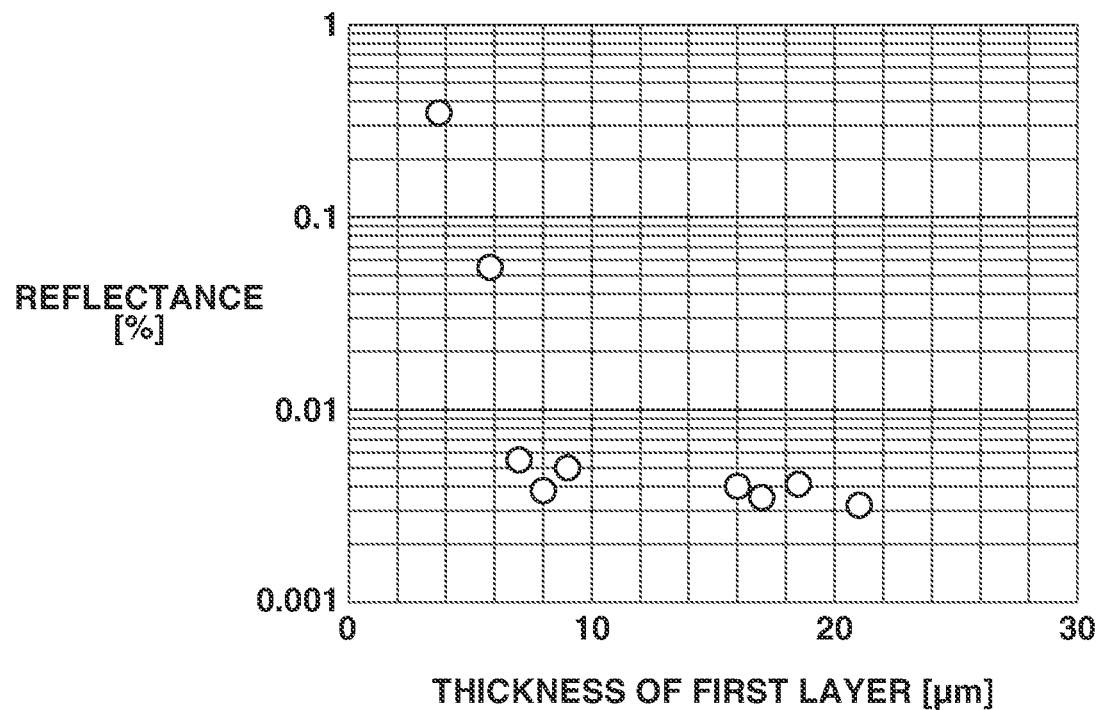
FIG. 6 is a graph indicating a dependency of a reflectance of an optical member on a thickness of a first layer of an example 3.

An optical member of an example 3 was obtained by a method similar to that of the example 1 except that the thickness of the first layer was changed by controlling the etching rate by changing an anodizing time and/or a current density in anodizing processing. The thicknesses of the first layers of the obtained optical members were 3.7 µm, 5.8 µm, 7 µm, 8 µm, 9 µm, 16 µm, 17 µm, 18.5 µm, and 21 µm. FIG. 6 illustrates a plotted result in which a horizontal axis represents the thickness of the first layer, and a vertical axis represents the reflectance of the optical member at the incident angle of 5 degrees.

From FIG. 6, it can be understood that the reflectance exceeds 0.01% if the thickness of the first layer is less than 7 µm.

Example 4

An optical member of an example 4 was obtained by a method similar to that of the example 1 except that a solvent was changed from acetone to isopropyl alcohol in the process for immersing in the solvent.

The reflectance of the optical member of the example 4 at the incident angle of 85 degrees was 1.8%. The reflectance was higher as compared with the example 1 using acetone but was a good value of 2.0% or less.

The thickness of the first layer was 7 µm. The thickness of the second layer was 10.2 µm. The projection portions included the first shape having a thickness in the range of 0.1 µm or more and 1.1 µm or less and the second shape having a thickness in the range of 10 µm or more and 50 µm or less. The ratio of the number of the projection portions to the area of the first layer was 118 pieces/100 µm$^2$.

Comparison Example 1

An optical member of a comparison example 1 was obtained by a method similar to that of the example 1 except that the process for dyeing was not performed.

The reflectance of the optical member of the comparison example 1 at the incident angle of 85 degrees was 5%. It can be considered to be due to absence of the first layer including black porous aluminum oxide.

As described above, alumite treatment and dyeing treatment were performed on the base material mainly containing aluminum, and thus, the first layer including black porous aluminum oxide and the second layer including aluminum oxide having a plurality of the projection portions could be laminated on the base material. The optical members on which the first layer and the second layer were laminated all exhibited a good average reflectance of 2.0% or less at the incident angle of 85 degrees in the wavelength range of 550 nm or more and 650 nm or less. In addition, the present disclosure adopts a simple manufacturing method using the alumite treatment, and thus it is unlikely that the projection portions will fall off the base material. Therefore, the present disclosure can provide an optical member of which an optical characteristic is unlikely to change due to aging and vibration unlike electrostatic flocking.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-180957, filed Sep. 30, 2019, and Japanese Patent Application No. 2020-129816, filed Jul. 31, 2020, which are hereby incorporated by reference herein in their entirety.

What is claimed is:

1. An optical member comprising:
 a base material containing aluminum or aluminum alloy;
 a first layer including black porous aluminum oxide provided on the base material; and
 a second layer including aluminum oxide having a plurality of projection portions provided on the first layer.

2. The optical member according claim 1, wherein each of the plurality of projection portions has a tapered shape toward a tip.

3. The optical member according claim 1, wherein a thickness of the second layer is 2 µm or more and 15 µm or less.

4. The optical member according claim 1, wherein a thickness of the first layer is 7 µm or more and 100 µm or less.

5. The optical member according claim 1, wherein, in a case where the optical member is viewed in a plan view from an extending direction of the projection portions, a ratio of a number of the projection portions to an area of the first layer is 50 pieces/100 µm$^2$ or more and 150 pieces/100 µm$^2$ or less.

6. The optical member according claim 1, wherein the projection portion includes a first shape having a thickness of 0.1 µm or more and 1.1 µm or less and a second shape having a thickness of 10 µm or more and 50 µm or less.

7. The optical member according claim 1, wherein an average reflectance of the optical member is 2.0% or less at an incident angle of 85 degrees in a wavelength range of 550 nm or more and 650 nm or less.

8. An optical apparatus comprising an optical system including a housing and a plurality of lenses in the housing,
 wherein at least a part of a supporting body configured to support the plurality of lenses and/or the housing is formed by the optical member according to claim 1, and the second layer is provided on an inner wall side of the supporting body and/or the housing.

9. An imaging apparatus comprising:
 an optical system including a housing and a plurality of lenses in the housing; and
 an image pickup element configured to receive light passing through the optical system,
 wherein at least a part of a supporting body configured to support the plurality of lenses and/or the housing is formed by the optical member according to claim 1, and the second layer is provided on an inner wall side of the supporting body and/or the housing.

10. A method for manufacturing an optical member, comprising:
 performing alumite treatment on a base material containing aluminum or aluminum alloy to form porous aluminum oxide on a surface of the base material;
 etching the porous aluminum oxide to form a projection portion containing aluminum oxide; and
 dyeing the base material on which the projection portion is formed black and forming a first layer including black porous aluminum oxide on the base material and a second layer including aluminum oxide having a plurality of projection portions on the first layer.

11. The method according to claim 10, further comprising immersing the base material on which the porous aluminum oxide is formed in a solvent between forming the porous aluminum oxide on the surface of the base material and forming the projection portion made of the aluminum oxide.

12. The method according to claim 11, wherein the solvent is acetone or isopropyl alcohol.

* * * * *